W. B. KERRICK.
WHEEL.
APPLICATION FILED APR. 12, 1920.
1,377,354.
Patented May 10, 1921.
2 SHEETS—SHEET 1.
Fig. 1.
Fig. 2.
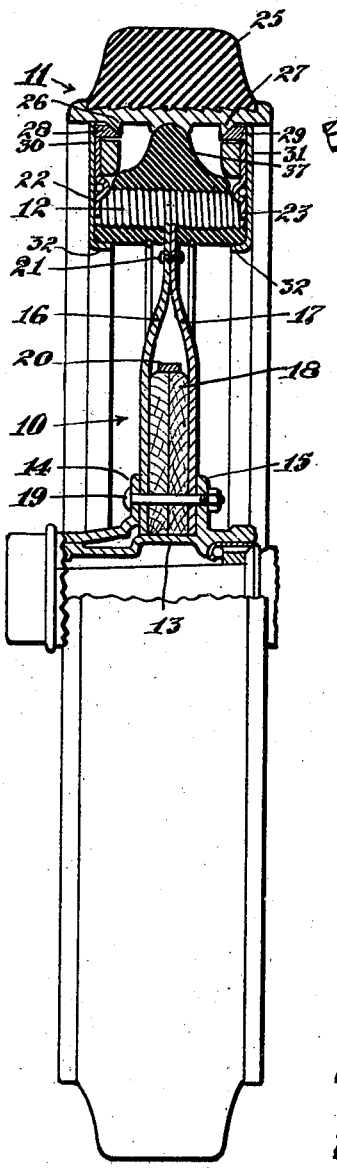
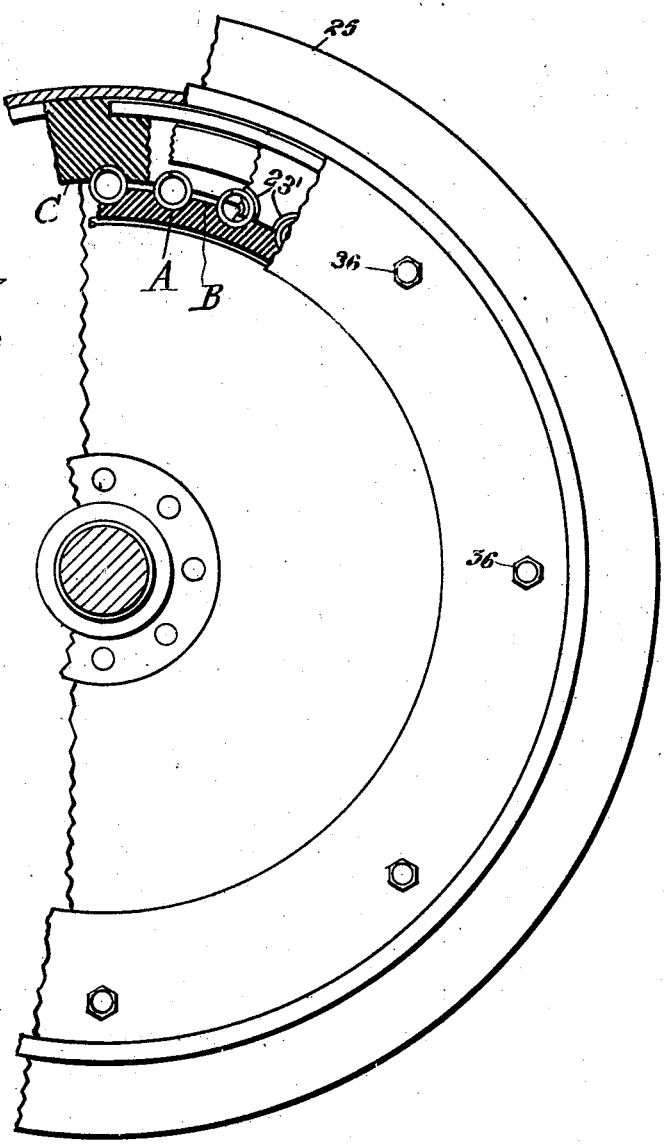
INVENTOR
WALTER B. KERRICK
BY
ATTORNEY

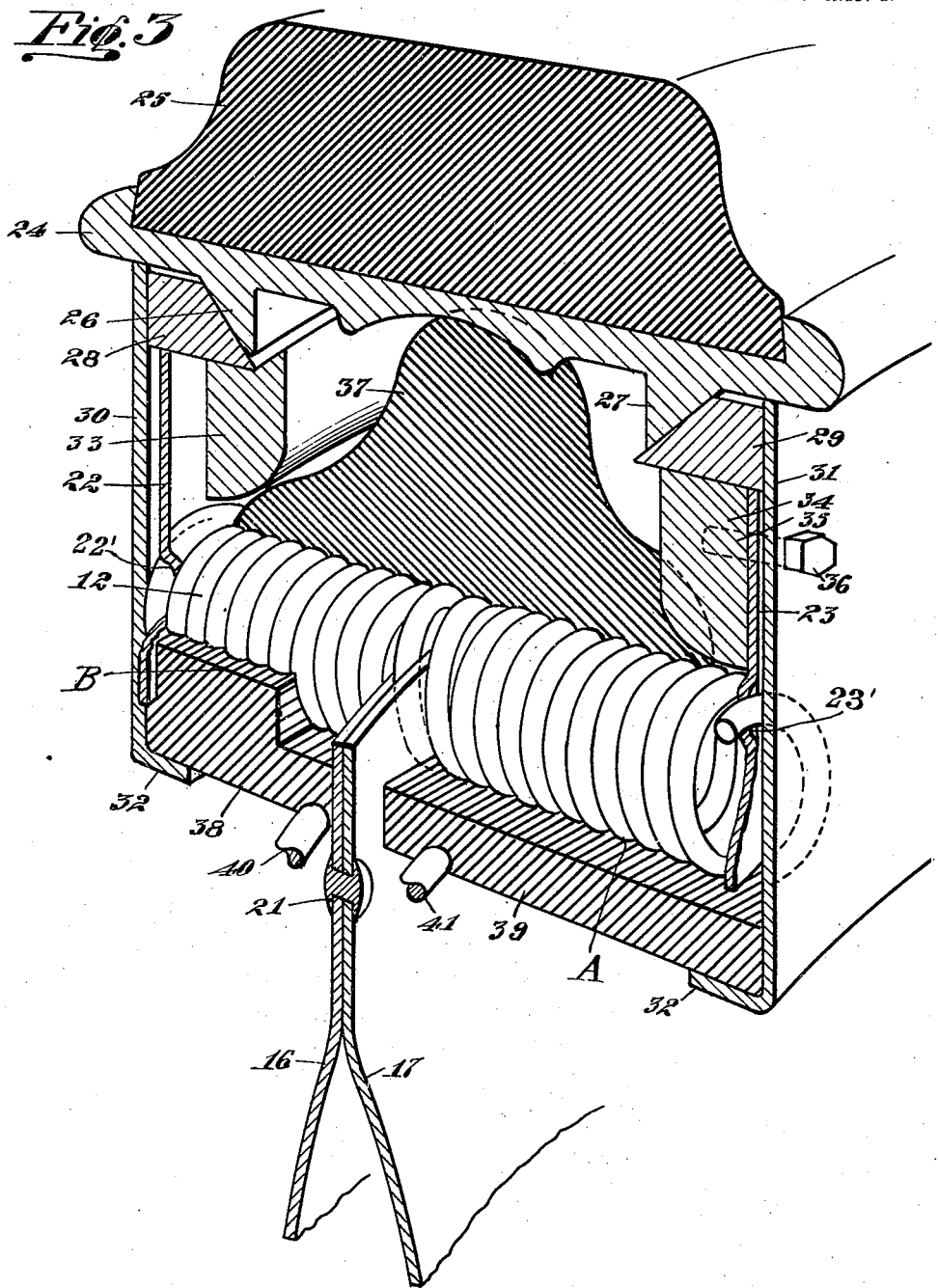

UNITED STATES PATENT OFFICE.

WALTER B. KERRICK, OF LOS ANGELES, CALIFORNIA.

WHEEL.

1,377,354. Specification of Letters Patent. Patented May 10, 1921.

Application filed April 12, 1920. Serial No. 373,033.

*To all whom it may concern:*

Be it known that I, WALTER B. KERRICK, a citizen of the United States, residing at Los Angeles, in the county of Los Angeles and State of California, have invented new and useful Improvements in Wheels, of which the following is a specification.

This invention relates to a wheel and particularly pertains to a resilient wheel of the type embodying a series of transversely extending helical springs affixed intermediate their terminals to the central portion of the wheel and having their ends engaged with the sides of the wheel rim.

It is the object of this invention to provide a construction in a wheel of the above character by which the spring members may be encased in such manner as to practically exclude dirt and water and in which the spring inclosure will operate to cushion the action of the springs and also serve to permit the use of lighter springs than otherwise.

Another object is to provide an arrangement whereby the several wheel elements may be readily assembled, removed and replaced.

Other objects will appear hereinafter.

The invention is illustrated in the accompanying drawings, in which:

Figure 1 is a view of a wheel as seen in end elevation and partly in vertical section.

Fig. 2 is a fragmentary view in side elevation with parts broken away.

Fig. 3 is a detail in section and perspective of the rim portion of the wheel.

More specifically 10 indicates an inner wheel member 11, an outer wheel member encirling the inner member, and 12 a series of spiral springs interposed between the wheel members. The inner member embodies a hub 13 having a pair of relatively movable flanges 14—15, and includes a pair of metallic disks 16—17 disposed on the opposite sides of a wooden spacing annulus 18 preferably consisting of laminated segments of wood arranged with adjacent layers in crossed-grain relation to each other; the plates being clamped against the sides of the wood spacer by bolts 19 passing therethrough and engaging the hub flanges. The flange 15 is fixed on the hub 13 and the flange 14 is movable thereon, so that when the bolts 19 are fastened in place as shown in Fig. 1 the plates 16 and 17 and the spacing annulus 18 will be clamped between the flanges 14 and 15. A metallic rim 20 encircles the circumference of the spacer to bind the wood against outward expansion under the pressure imposed thereon between the plates. The outer portions of the plates are brought together and are connected by rivets 21 or other suitable fastenings.

The springs 12 are mounted on the periphery of the plates by clamping the latter on opposite sides of an intermediate coil of each spring so that the springs will extend horizontally from the opposite sides of the connected plates at the edges of the latter.

The ends of the springs are connected to demountable rings 22 and 23 comprising part of the outer wheel member, the inner edges of the rings being engaged between the end coils of the springs; the rings 22 and 23 having channels 22′ and 23′ pressed in their outer faces in which the end coils of the springs are seated.

The outer wheel member embodies a rim 24 adapted to receive a cushion tire 25 which rim is formed with a pair of beveled flanges 26 and 27 on its inner periphery, which flanges have their beveled or inclined faces on the side toward the edge of the wheel rim. A pair of split rings 28 and 29 are provided having inclined side faces which rings are adapted to be positioned with their inclined faces abutting against the corresponding inclined faces 26 and 27 of the shoulders; the split rings being of such outside diameter when expanded as to slidably fit the inner periphery of the wheel rim and have such inside diameter as to slidably encircle the rings 22 and 23.

Abutting against the outer faces of the split rings are face plates 30 and 31 which are constructed in the form of flat rings the outer edges of which slidably fit the inner periphery of the wheel rim and the inner edges of which extend to a point below the plates 22 and 23 beyond the ends of the springs 12 and are turned inwardly to form marginal flanges 32 on their inner edges. The face plates 30 and 31 with the split rings 28 and 29, in bearing against the flanges 26 and 27 on the wheel rim, constitute side members on the outer wheel member by which connection is effected with the inner wheel member and by which the springs 12 may be placed under tension as will presently be described.

Arranged alongside the inner faces of the rings 22 and 23 are rings 33 and 34 which are formed with a series of internally threaded openings, 35 on their outer faces adapted to be engaged by bolts 36 inserted through openings in the face plates 30 and 31 and in the rings 22 and 23. The rings 33 and 34 have an outside diameter corresponding to the rings 22 and 23 and have such inside diameters as to clear the springs 12.

Mounted to seat on the springs 12 and bearing upon the inner periphery of the wheel rim is a cushion annulus 37 formed of rubber or similar resilient material and which annulus is of such width on its inner face as to extend substantially across the space between the plates 22 and 23 and is tapered in cross section from its edges toward its point of contact with the wheel rim thus forming an outwardly extending resilient wall between the springs and wheel rim, which is capable of yieldable movement in all directions and provides means for preventing excessive movement of the springs.

Extending from the opposite sides of the plates 16 and 17 and abutting against the inner portion of the springs 12 is a pair of flexible annular members 38 and 39 the inner edges of which abut against the outer faces of the plates 16 and 17, and the outer edges of which abut against the inner faces of the face plates 30 and 31 and seat upon the flanges 32. These annular members are held in place by split rings 40 and 41 which bear against the inner faces of the members adjacent to the plates 16 and 17. The members 38 and 39 serve to close the space between the springs to prevent moisture and dirt from gaining access to the space encompassed by the wheel rim, the side members and the springs. The outer peripheries of the annular members 38 and 39 are formed with transverse cavities A to receive the springs forming projections B which extend between the springs and coöperate with the corresponding projections C on the inner periphery of the cushion annulus 37 in yieldably restraining lateral flexure of the spring.

In assembling the wheel, the springs are placed in position on the inner wheel member and the resilient members 38 and 39 are disposed against the inner portions thereof. The outer resilient annulus 37 is disposed around the springs and crowded into engagement with the wheel rim, the side rings 33 and 34 are positioned on opposite sides of the annulus 37 and the spring engaging rings 22 and 23 are connected to the ends of the springs. The split rings 28 and 29 are then disposed against shoulders 26 and 27 and the face plates 30 and 31 are disposed against the outer faces of the split rings. The springs 12 being contracted the spring engaging rings 22 and 23 and the side rings 33 and 34 are then spaced from the inner faces of the face plates. The bolts 36 are then passed through the face plates and screwed into engagement with the rings 33 and 34 and on tightening the bolts serve to draw the face plates and the split rings 28 and 29 inwardly and draw the spring engaging rings 22 and 23 outwardly in opposition to the tension of the springs 12 and thus distending the springs to place them under tension. The split rings moving inwardly on the inclined shoulders will be contracted into tight circumferential engagement with the outer peripheries of the rings 22—23 and 33—34 and thus serve to effect a wedge engagement between the inner and outer wheel members. The springs 12 will thus be placed under tension so as to afford resilient connection between the inner and outer members to cushion their relative movement in all directions. Clearance is provided between the sides of the annulus 37 and the side rings to permit distortion thereof under pressure and this annulus being yieldable is adapted to be compressed in event the spaces in the sides thereof become filled with water and subjected to a freezing temperature.

While I have shown and described a specific embodiment of my invention I do not limit myself to the exact details of construction here shown but may resort to any modification or changes as occasion may require without departing from the scope of the invention as set forth in the appended claims.

I claim:

1. In a wheel, an inner wheel member, an outer wheel member encircling same, a series of helical springs connecting the opposite sides of the inner wheel member to the sides of the outer wheel member, and an annular cushion member interposed and bearing between said springs and the outer member and acting to yieldably restrain flexure of said springs.

2. In a wheel, an inner wheel member, an outer wheel member encircling said inner wheel member and spaced therefrom, a series of helical springs connecting the opposite sides of the inner wheel member to each side of the outer wheel member and normally disposed substantially parallel with the axis of the wheel, and means bearing between said springs and the outer wheel member for yieldably restraining flexure of said springs.

3. In a wheel, an inner wheel member, an outer wheel member encircling said inner wheel member and spaced therefrom, a series of helical springs connecting the opposite sides of the inner wheel member to each side of the outer wheel member and normally disposed substantially parallel with the axis of the wheel, means bearing between said springs and the outer wheel member for yieldably restraining flexure of said springs, and an annular cushion member bearing against said springs and forming a yieldable inclosure therefor.

4. In a wheel, an inner wheel member, an outer wheel member encircling said inner wheel member and spaced therefrom, a series of helical springs connecting the opposite sides of the inner wheel member to each side of the outer wheel member and normally disposed substantially parallel with the axis of the wheel, means bearing between said springs and the outer wheel member for yieldably restraining flexure of said springs, and an annular cushion member bearing against said springs and forming a yieldable inclosure therefor, said last named cushion member formed with transverse cavities on its outer periphery to receive the springs and serving to yieldably restrain lateral flexure of said springs.

5. In a wheel, an inner wheel member, an outer wheel member, a series of laterally disposed helical springs projecting from the sides of said inner wheel member and connecting at their outer extremities with the sides of said outer wheel member, and means encircling the cylindrical body formed by said springs for yieldably opposing flexure of said springs in every direction.

6. In a wheel, an inner wheel member, an outer wheel member, a series of laterally disposed helical springs projecting from the sides of said inner wheel member and connecting at their outer extremities with the sides of said outer wheel member, an annular cushion member bearing between the outer sides of said springs and the outer wheel member, having recesses on its inner wall in which said springs extend, and an inner annular cushion member inclosing the inner sides of said springs and having cavities on its outer wall into which said springs project.

7. In a wheel, an inner wheel member, an outer wheel member, a series of helical springs connecting the opposite sides of said inner wheel member to the sides of the outer wheel member, side plates carried by the outer wheel member and spaced from the opposite sides of the inner wheel member, and annular yieldable housing members extending between said plates and the inner wheel member and abutting against the inner sides of said springs.

8. In a wheel, an inner wheel member, an outer wheel member, a series of helical springs connecting the opposite sides of said inner wheel member to the sides of the outer wheel member, side plates carried by the outer wheel member and spaced from the opposite sides of the inner wheel member, and annular yieldable housing members extending between said plates and the inner wheel member and abutting against the inner sides of said springs, said members having peripheral recesses into which said springs project.

9. In a wheel, an inner wheel member, a wheel rim encircling said inner wheel member and spaced therefrom, a series of springs extending outwardly from the opposite sides of the inner wheel member and connecting with said wheel rim arranged to permit limited universal movement of the rim and the inner member relative to each other, and an annular cushion member interposed between said inner wheel member and the rim and coöperating with said springs in resiliently opposing movement of the inner wheel member and the rim relative to each other.

10. In a wheel, an inner wheel member, a wheel rim encircling said inner wheel member and spaced therefrom, a series of springs extending outwardly from the opposite sides of the inner wheel member and connecting with said wheel rim arranged to permit limited universal movement of the rim and the inner member relative to each other, and an annular cushion member interposed between said inner wheel member and the rim and coöperating with said springs in resiliently opposing movement of the inner wheel member and the rim relative to each other, said cushion member bearing on the outer sides of said springs substantially throughout their lengths and abutting against the rim centrally of the width thereof.

11. In a wheel, a hub having a pair of relatively movable flanges, a pair of disks encircling said hub between said flanges, a fibrous spacing block encircling the hub between said flanges, means for clamping said disks in frictional engagement with said spacing member, whereby said member will be forced into clamping engagement with said hub, and means for holding said spacing member against diametrical expansion.

WALTER B. KERRICK.